United States Patent [19]
Shulman et al.

[11] Patent Number: 6,065,035
[45] Date of Patent: May 16, 2000

[54] METHOD AND SYSTEM FOR PROCEDURE BOUNDARY DETECTION

[75] Inventors: Matthew A. Shulman, Bellevue; Martin Cibulka, Redmond, both of Wash.

[73] Assignee: Microsoft Corporation, Redmond, Wash.

[21] Appl. No.: 08/663,448

[22] Filed: Jun. 13, 1996

[51] Int. Cl.[7] ....................................... G06F 9/00
[52] U.S. Cl. ............................................. 709/100
[58] Field of Search ................... 395/701, 703, 395/704, 705, 700, 708

[56] References Cited

U.S. PATENT DOCUMENTS 5,410,648  4/1995  Pazel ........................................ 395/704

OTHER PUBLICATIONS

Writing Compilers and Interpreters, An Applied Approach, Ronald Mark, 1991, John Wiley & Sons, Inc.
Lesavich, *Distributed Debugging: An Integrated Approach*, Ch. IV, pp. 61–80, Illinois Institute of Technology (doctoral dissertation), May, 1991.

"C Programming in 12 Easy Lessons", Greg Perry, SAMS publishing, 1994.

*Primary Examiner*—Majid A. Banankhah
*Attorney, Agent, or Firm*—Klarquist Sparkman Campbell Leigh & Whinston, LLP

[57] ABSTRACT

The boundaries of a desired procedure in source code are determined even if there are an unequal number of begin and end procedure instructions due to conditional compilation or other programming instructions. In addition, the comments associated with a desired procedure, including those comments separated from the procedure by multiple blank instructions, are determined. The desired procedure, with correct boundaries and associated comments, is displayed in a procedural view for a user. Displaying procedures in a procedural view makes the creation, development and debugging of computer software, which is divided into multiple procedures, easier and more efficient. In addition, an accurate procedural view of software also helps reduce overall software development and maintenance costs.

32 Claims, 13 Drawing Sheets

FIG. 3A

```
line 1     sub NumUsers
line 2         NU=1
line 3     end sub
line 4
line 5     'Subroutine to define the number of computers
line 6
line 7
line 8     #if Version1 'Conditional Compilation Directive
line 9         sub NumCom
line 10            NC=5
line 11    #else
line 12        sub NumCom
line 13            NC=10
line 14    #endif
line 15    end sub
line 16
line 17    'Set up the number of computers
line 18    'that are available
line 19
line 20    NumCom  ' Call NumCom subroutine
line 21
```

FIG. 3B

```
line 1     sub NumUsers
line 2         NU=1
line 3     end sub
line 4
line 5     'Subroutine to define the number of computers
line 6
line 7
line 8             'Conditional Compilation Directive
line 9         sub NumCom
line 10            NC=5
line 11
line 12
line 13
line 14
line 15    end sub
line 16
line 17    'Set up the number of computers
line 18    'that are available
line 19
line 20    NumCom  ' Call NumCom subroutine
line 21
```

PRIOR ART ILLUSTRATION

FIG. 3C

```
line 1      sub NumUsers
line 2          NU=1
line 3      end sub
line 4
line 5      'Subroutine to define the number of computers
line 6
line 7
line 8          'Conditional Compilation Directive
line 9
line 10
line 11
line 12         sub NumCom
line 13             NC=10
line 14
line 15     end sub
line 16
line 17     'Set up the number of computers
line 18     'that are available
line 19
line 20     NumCom  ' Call NumCom subroutine
line 21
```

PRIOR ART ILLUSTRATION

FIG. 3D

```
line 12         sub NumCom
line 13             NC=10
line 14     #endif
line 15     end sub
```

PRIOR ART ILLUSTRATION

| | |
|---|---|
| line 5 | 'Subroutine to define the number of computers |
| line 6 | |
| line 7 | |
| line 8 | #if Version1 'Conditional Compilation Directive |
| line 9 |     sub NumCom |
| line 10 |         NC=5 |
| line 11 | #else |
| line 12 |     sub NumCom |
| line 13 |         NC=10 |
| line 14 | #endif |
| line 15 | end sub |

PROCEDURAL VIEW ON
USER INTERFACE

LINEAR VIEW ON USER INTERFACE

METHOD AND SYSTEM FOR PROCEDURE BOUNDARY DETECTION

FIELD OF INVENTION

The present invention relates to the creation and debugging of computer software. More specifically, it relates to the detection of procedure boundaries within computer software source code and the display of the source code in a procedural view.

BACKGROUND AND SUMMARY OF THE INVENTION

Computer software is designed and developed to solve problems and/or accomplish a particular set of tasks. When computer software is developed for digital computers, the logical objectives to be accomplished by the software are typically determined during the design or planning phase. These logical objectives are often allocated to named parts of the software called procedures, functions, subroutines, etc. (hereinafter called procedures) during the development phase. Each procedure encapsulates one or more of the logical objectives determined for the software during the design phase.

As is known in the art, it is common to display a computer software source code with tools (e.g., editors, code viewers, debuggers, etc.) that display the source code in a linear or monolithic view. The source code (including source code containing multiple procedures) is typically displayed beginning at the top of the source code. A software developer will scroll down through the source code to locate a desired portion of source code (e.g., a procedure). If a developer wishes to focus on a particular procedure within the source code, a search is typically completed using a keyword (e.g., procedure name) within the procedure to locate it within the source code.

There are also tools, however, such as those provided in Visual Basic® 3.0 by Microsoft Corporation, and the Concurrent C++ Editor described in "Distributed Debugging: An Integrated Approach", by Stephen Lesavich, a 1991 PhD Dissertation from the Illinois Institute of Technology, Chicago, Ill., that parse the source code, extract procedures, and provide ability to view the source code in the procedural view. Viewing source code in a procedural view instead of a linear or monolithic view, makes it easier for a software developer to create and debug code that accomplishes the logical objectives determined for the software.

There are several problems associated with existing methods used to view source code containing multiple procedures using a procedural view. Conditional compilation instructions are often used to define the beginning and ending boundaries of a procedure. Conditional compilation instructions are used as a mechanism to allow a computer language compiler to simultaneously incorporate and exclude different portions of the same source code based on a pre-determined condition. For example, conditional compilation instructions containing two possible ending boundaries for the same procedure have the format:

```
begin procedure 1
#if VAR 1
    do first set of things
end procedure 1
#else
    do second set of things
end procedure 1
#endif
```

In the above example, if the pre-determined conditional compilation variable VAR1 has a value other than zero (i.e., making the #if VAR1 instruction true), the source code instructions representing the 'first set of things' is compiled along with the first 'end procedure1' instruction. If VAR1 has a value equal to zero (i.e., making the #if VAR1 instruction false, so the #else instruction is executed), the source code instructions for the 'second set of things' is compiled along with the second 'end procedure1' instruction. A similar sequence of conditional compilation instructions may also be present for the beginning boundary of a procedure. The instructions for the first and second set of things to do in the above example may each provide functionality for a totally unique, and potentially mutually exclusive procedure whose actual functionality is not determined until the source code containing the procedure is actually compiled (e.g., a procedure which is a client in one application, and a server in another).

Conditional compilation causes a problem for many editors, source code viewers, and other tools which provide a procedural view of source code. When a procedure is being developed or debugged, it is necessary to view the whole procedure, including procedure begin/end instructions contained within conditional compilation instructions. Many of the tools which allow source code to be shown in a procedural view typically employ pattern matching processes which look for a single pair of "begin" and "end" instructions or markers for each procedure. However, conditional compilation instructions permit a developer to define more than one begin instruction, and more than one end instruction for a procedure, often resulting in a uneven number of begin/end instructions in the source code.

Conditional compilation instructions make this type of begin/end instruction pair pattern matching difficult, and in many cases make it nearly impossible for existing software development tools to determine what the actual boundaries of a procedure are. As a result, it is difficult to correctly display the whole procedure with tools that provide a procedural view of source code.

In addition, it is common for a software developer to put comment instructions (hereinafter comments) before, after, and within procedures in source code. Comments typically contain a "plain English" description of the procedure functionality and components, and are delineated by special markers (e.g., "//", "/* */", """, "rem" etc.) Since comments can be put anywhere in and/or around a procedure, it is also difficult to determine which comments are associated with a given procedure in source code, when a procedural view is used. For example, if source code contains the following sequence of lines:

```
comment 1
procedure one begin
    procedure one instructions
procedure one end
comment 2
comment 3
procedure two begin
    procedure two instructions
```

-continued procedure two end it is hard to determine which procedure (i.e., procedure one or two) comment 2 is associated with. Most tools which provide a procedural view cannot determine if comment 2 is a comment trailing, but associated with, procedure one, or is a comment preceding but associated with procedure two. Conditional compilation instructions within a procedure containing comments further complicate comment processing in a manner similar to the procedure boundary determinations described above.

In accordance with the present invention, the problems associated with viewing source code in a procedural view are overcome. Procedure boundaries are determined automatically (i.e., without additional input from a user) with a procedure boundary detection method. The procedure boundary detection method, which will be explained in detail below, accurately determines the boundaries of procedures, including the boundaries of procedures which have an unequal number of begin/end instructions (e.g., procedures whose beginning and ending instructions are contained in conditional compilation instructions). The procedure boundary detection method determines procedure boundaries by selecting source code including one or more procedures, searching the source code for the procedures (i.e., searching for procedure begin/end instructions), and automatically (i.e., without further user input) determining the boundaries of the procedures found in the source code by examining the source code instructions which precede/succeed the procedure beginning and ending instructions.

A preferred procedure boundary detection method accurately determines procedure boundaries in a linear search time N from any position within the source code where N is the number of source code instructions in any selected procedure. This is an improvement over other procedure boundary detection methods known in the art which typically require a search time proportionate to M where M is the number of instructions in the entire source code. This is because these methods involve searching all the source code from top-to-bottom or bottom-to-top. However, the M search time boundary detection methods known in the art do not correctly determine the boundaries of procedures with an unequal number of begin/end instructions. The procedure boundary detection method of the present invention also matches comments in and around procedures, to the appropriate procedure based on spacing of the comments. As a result, the proper procedure boundaries, including comments associated with the procedure, are accurately displayed in a procedural view.

The procedure boundary detection method allows a developer to view procedures and their associated comments contained within source code in a procedural view. This makes the creation, development, and debugging of computer software which is divided into a multiple of procedures, easier and more efficient. The procedure boundary detection method also speeds the software development process and helps reduce overall software development and maintenance costs by providing an accurate display of procedures in source code.

The foregoing and other features and advantages of the present invention will be more readily apparent from the following detailed description, which proceeds with reference to the accompanying drawings.

BRIEF DESCRIPTION OF THE DRAWINGS

FIG. 3A is exemplary source code used to illustrate a preferred embodiment of the present invention.

FIG. 3B is an illustration of conditional compilation on the source code in FIG. 3A.

FIG. 3C is a second illustration of conditional compilation on the source code in FIG. 3B.

FIG. 3D is an illustration of a procedural view of a procedure from the source code in FIG. 3A using a prior art procedure boundary detection method.

DETAILED DESCRIPTION OF A PREFERRED EMBODIMENT

Figure 1:
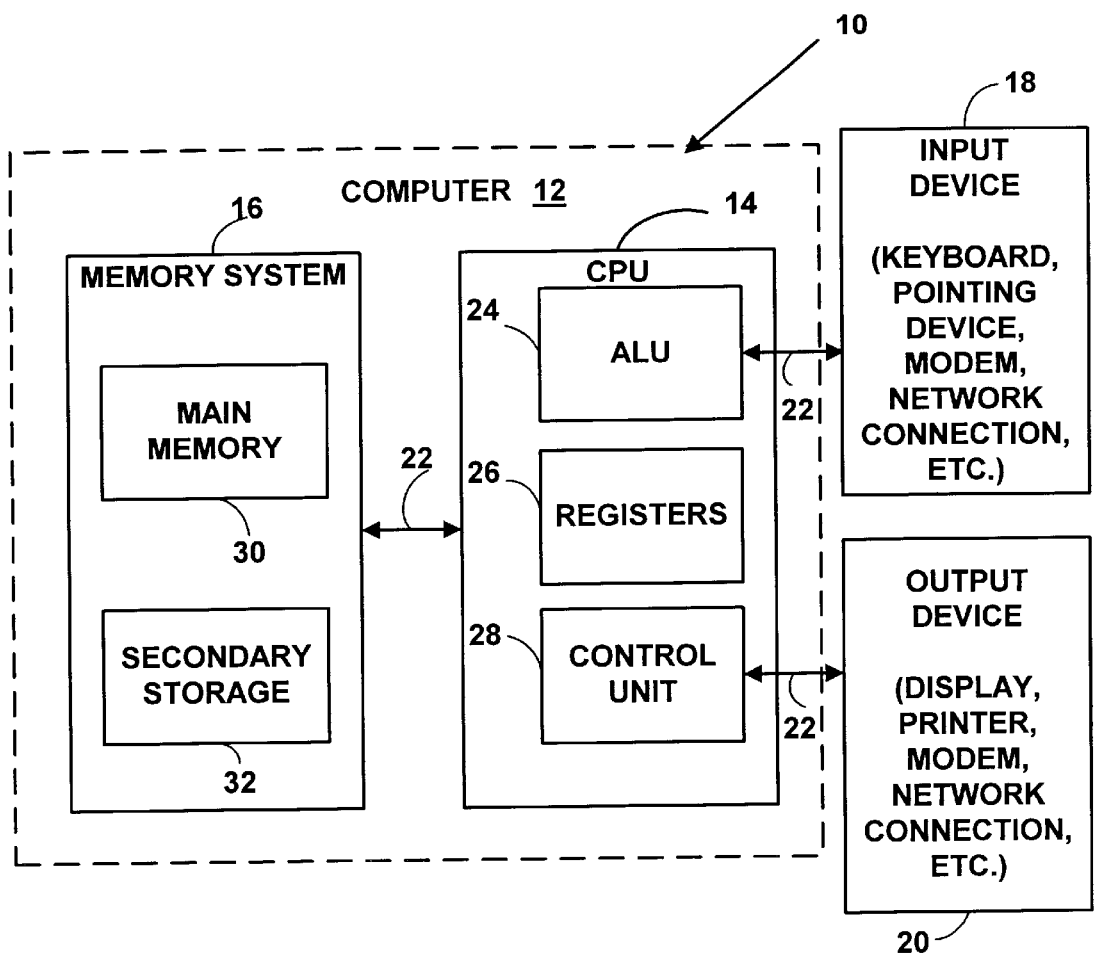
FIG. 1 is a block diagram of a computer system used to implement a preferred embodiment of the present invention.

Referring to FIG. 1, an operating environment for a preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g. a microphone, etc.), or any other device providing input to the computer system 10. The output device 20 can comprise a display, a printer, an audio device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits. The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or which are distributed among multiple interconnected computer systems 10 that may be local or remote.

Figure 2:
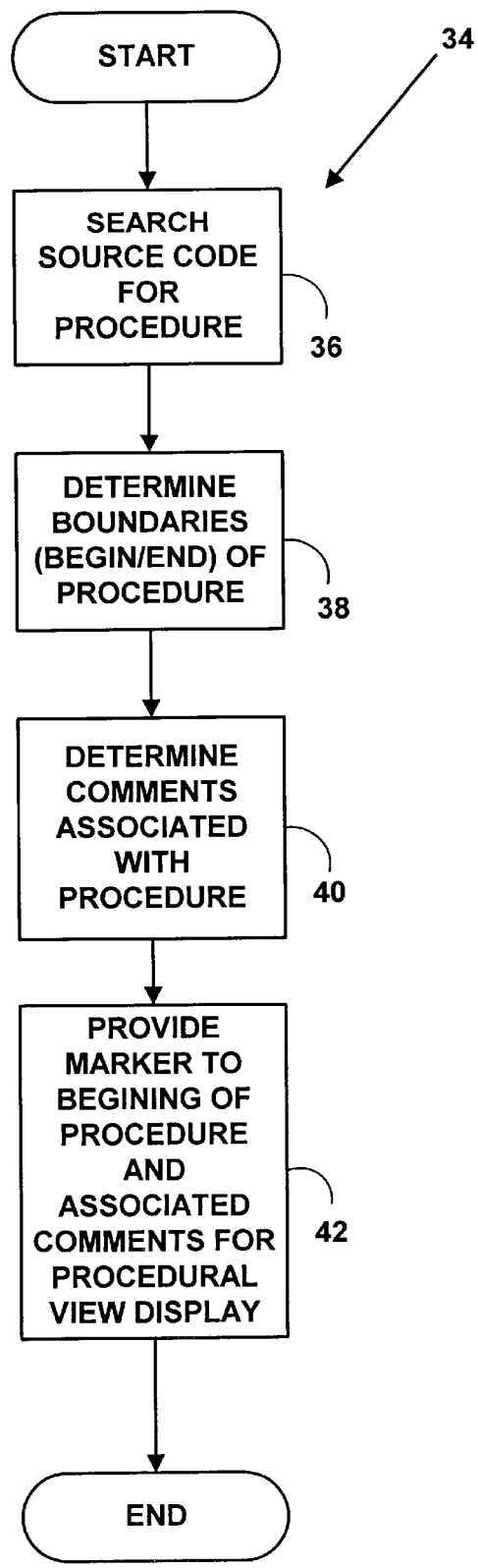
FIG. 2 is a flow chart illustrating a preferred embodiment of the present invention.

FIG. 2 shows a preferred embodiment of a procedure boundary detection method 34 of the present invention for determining the boundaries of procedures along with their associated comments, even if there is an unequal number of procedure begin/end instructions. The determination of procedure boundaries is completed automatically (i.e., without additional input from a user), once a user desires to view a desired procedure in a procedural view.

As is shown in the FIG. 2, the procedure boundary detection method 34 searches source code containing instructions capable of being executed by a computer for a desired procedure 36. The boundaries of the procedure are determined 38, searching instructions preceding and succeeding the desired procedure begin/end instructions. The procedure boundary searching will be explained in detail below. Once the boundaries of the desired procedure have been determined, the comments associated with the procedure are then determined 40 (e.g., based on the spacing of the comments.) A marker (e.g., a pointer) to the "beginning" of the desired procedure (i.e., the desired procedure including associated comments) is provided. The marker is used to display the desired procedure with associated comments in a procedural view 42.

The procedure boundary detection method 34 is used to display a desired procedure and its associated comments correctly in a procedural view. The procedure boundary detection method can be used from any position in source code to search preceding and/or succeeding instructions in the source code to properly determine procedure boundaries. For simplicity, hereinafter searching instructions preceding a position in the source code will be referred to as "searching up, or upwards", and instructions succeeding a position in the source code will be referred to as "searching down, or downwards."

Computer software is designed and developed to solve problems and/or accomplish a particular set of tasks. When computer software is developed for digital computers, the logical objectives to be accomplished by the software are typically determined during the design or planning phase. The logical components are allocated to named parts of the computer software called procedures, functions, subroutines, etc. (hereinafter called procedures) during the development phase. Each procedure encapsulates one or more of the logical objectives determined for the software during the design phase.

It is common in the art to provide a one-to-one correspondence between logical components of the software and the procedures used to implement the logical components. However, it is also common in the art to combine one or more logical components in a single procedure or split a complex logical component into multiple procedures. The source code containing procedures typically is placed in main memory 30 and/or secondary storage 32 of the memory system 16 in the computer system 10.

Many programming languages also provide functionality to create "buttons," "slide-bars", etc. on a graphical interface and handle events from these buttons, slide-bars, etc. Graphical interfaces are used in a wide variety of software applications including network applications such as Internet applications, World Wide Web pages, etc. Graphical interfaces are often created with specialty programming languages such as Visual Basic®, Hyper Text Markup Language (HTML) for Internet and other network applications, Delphi, by Borland Corporation, of Scotts Valley, Calif., JAVA, by Sun Microsystems of Mountain View, Calif., etc. The details creating graphical interfaces using specialty languages are known to those skilled in the art.

When a graphical button is "pressed" or a graphical slide bar is "moved," (i.e., by input from the keyboard, mouse, pointing device, etc.) an "event" occurs, and the instructions in a procedure associated with the button, slide bar, etc. are executed. Each button/slide bar procedure is stored in the source code and provides source code instructions to isolate the functionality of a particular button/slide bar on the graphical interface.

The logical components, and the "buttons," "slide-bars," etc. described above are typically implemented in procedures in the desired programming language that was chosen to create the software (e.g. assembly language, a high level programming language such as Basic, C, C++, Visual Basic®, Visual C++, JAVA, etc.). Each procedure is defined by a procedure boundary (i.e., by begin and end instructions) whose syntax is dependant on the high level language chosen to implement the software, and contains a sequence of instructions which define the functionality of the procedure.

In the Visual Basic® programming language by Microsoft Corporation of Redmond, Wash., the boundaries of a procedure (called a "subroutine" in Visual Basic®) are determined with a "sub/end sub" instruction pair as is shown in the following example:

```
sub Seven
    X = 7
end sub
```

The instruction "sub Seven" defines the beginning of a procedure named "Seven," and the instruction "end sub" defines the ending of procedure Seven. This procedure sets the value of the Visual Basic programming variable X to the value of seven with procedure instruction "X=7" The same procedure in the C/C++/Visual C++ programming language would have the syntax:

```
Seven()
{
    X = 7;
}
``` where the first brace "{" is the instruction that defines the beginning of the procedure named Seven, and the second brace "}" is the instruction defines the end of procedure Seven. Other programming languages have other beginning and ending instructions for procedures that depend on the defined syntax for the language.

As was described above, the logical components determined for the software are often allocated to multiple procedures, which provide the desired functionality for the logical components. When the multiple procedures are being developed and debugged, it is desirable to view each individual procedure in isolation.

As is known in the art, there are tools, such as Visual Basic® 3.0, that provide the capability to view source code in a procedural view (i.e., isolating each procedure contained within the source code). The source code includes a sequence of instructions suitable for processing by a computer. The sequence of instructions in the source code are typically transformed (e.g., by a compiler, assembler, linker, etc.) to symbolic representations of operations that are performed by a computer (e.g., computer system 10). Conditional compilation instructions, the placement of comment instructions (hereinafter comments), and the placement of comments within conditional instructions, make isolating procedures in source code a difficult task.

A portion of exemplary source code instructions 44 written in the Visual Basic® programming language, is shown in FIG. 3A. The source code in FIG. 3A contains two procedures, one called "NumUsers," defined by the instructions at lines one through three, and one called "NumCom," defined by the instructions at lines five-fifteen. Conditional compilation instructions, and comments are also shown in FIG. 3A. Conditional compilation instructions, such as those on lines 8, 11, and 14, begin with a pound or number symbol "#". Comments such those on lines 5, 8, 17, 18 and 20, begin with an apostrophe symbol "'". Line 8 contains both a conditional compilation instruction and a comment. There are also blank instructions (i.e., whitespace) on lines 4, 6, 7, 16, 19, and 21.

The conditional compilation directive Version1 is used to compile different portions of the source code shown in FIG. 3A. A conditional compilation directive is typically set to a value somewhere in the source code before the source code is compiled (e.g., #const Version1=1" in Visual Basic, and not shown in FIG. 3A).

For example, if Version1 is assigned a value other than zero, making the #if Version1 instruction true (i.e., FIG. 3A, line 8), then the instructions at lines nine and ten of FIG. 3A would be compiled. The procedure NumCom exists, and would be called by the instruction at line twenty (i.e., NumCom) to set the number of computers to five. The instructions contained within the #else clause (i.e., lines 12 and 13) would NOT be compiled, and would NOT exist anywhere in the compiled version, even though these instructions exist in the source code. FIG. 3B shows which source code instructions 46 from FIG. 3A would be compiled if Version1 had a value other than zero.

In the alternative, if Version1 had a value of zero, making the #if Version1 instruction false so the #else instruction would be executed, then instructions at lines twelve and thirteen of FIG. 3A would be compiled. Compiling the #else clause, the procedure NumCom exists, and would be called by the instruction at line twenty (i.e., NumCom) to set the number of computers to ten. FIG. 3C shows the source code instructions 48 which would be compiled if Version1 had a value of zero.

It is common to display source code with tools (e.g., editors, code viewers, debuggers, etc.) that display the source code in a linear or monolithic view which is illustrated in FIG. 3A. Conditional compilation instructions cause a problem for many editors, source code viewers, or other tools which provide a procedural view of the source code since an unequal number of begin/end instructions may be present in the source code.

Many of the tools which allow source code to be shown in a procedural view typically employ pattern matching processes known in the art which look for pairs of "begin" and "end" instructions. For example, typical pattern matching techniques will push each "begin" instruction encountered onto an internal computer application stack, and then pop a "begin" instruction from the stack for each "end" instruction encountered. If there are any "begin" instructions left on the stack after parsing all of the source code, there are unbalanced begin/end instructions somewhere in the source code.

This variety of pattern matching process does not take into account unbalanced begin/end instructions (i.e., an unequal number of begin/end markers) caused by conditional compilation instructions. As a result, source code which contains an unequal number of begin/end instructions can not correctly be displayed in a procedural view using pattern matching techniques currently known in the art.

As a specific example of this problem in Visual Basic®, procedure boundaries are determined by the instructions "sub" and "end sub". If the portion of the source code shown in FIG. 3A is searched for a desired procedure (e.g., NumCom), using one of the pattern matching processes known in the art which matches pairs of instructions looking for each sub/end sub instruction pair, a problem is immediately encountered because there are two distinct procedure beginnings defined within conditional compilation instructions (i.e., line 9 and line 12), and only one end of procedure instruction (i.e., end sub) on line 15 of FIG. 3A.

Searching the source code line shown in FIG. 3A from the top to the bottom starting from line one for the desired procedure NumCom, a first "sub" instruction is found on line 1 (i.e., for procedure NumUsers), saved, and the search continues for a first "end sub" instruction, which is found on line 3. Thus, the boundaries of procedure NumUsers have been determined. On line 8 a second "sub" instruction is encountered and saved for the desired procedure NumCom, so a second "end sub" instruction is expected. A third "sub" instruction (also for desired procedure NumCom as a result of conditional compilation instructions) is encountered on line 12 and saved. An "end sub" instruction is encountered on line 15, and this "end sub" instruction is matched with "sub" instruction from line 12 to complete the boundaries of a second procedure (i.e., one part of procedure NumCom). The remainder of the source code is searched, and no additional "end sub" instruction is encountered to match the sub instruction encountered on line 9. There is an unbalanced number of procedure begin instructions, since the begin instructions for procedure NumCom are defined within conditional compilation instructions. As a result, the desired procedure NumCom cannot be correctly displayed in a procedural view using techniques known in the art.

FIG. 3D shows the results 50 of a procedural view of the source code shown in FIG. 3A using the begin/end instruction pair pattern matching processes known in the art to display the desired procedure NumCom.

As can be seen from FIG. 3D, this procedural view 50 is incorrect and shows only a portion of the Numcom procedure instructions contained within the conditional compilation instructions. The procedure begin instruction "sub NumCom" at line 9 in FIG. 3A is ignored along with the procedure instruction "NC=5" at line 10 since there are an unbalanced number of procedure begin instructions (i.e., sub instructions) because of conditional compilation instructions. In addition, the comment (line 5) associated with the NumCom procedure in FIG. 3A is ignored altogether.

Many of the tools known in the art extract comments for a procedural view only if the comment directly precedes the procedure and is not separated by any blank instructions (e.g., white space, etc.). Even if the procedure could be correctly viewed, comments such as line 5 in FIG. 3A, would not be associated with the correct procedure (e.g., NumCom) since it separated by multiple blank instructions (i.e., white space), even though the comment was intended to be part of the procedure.

Figure 4A:
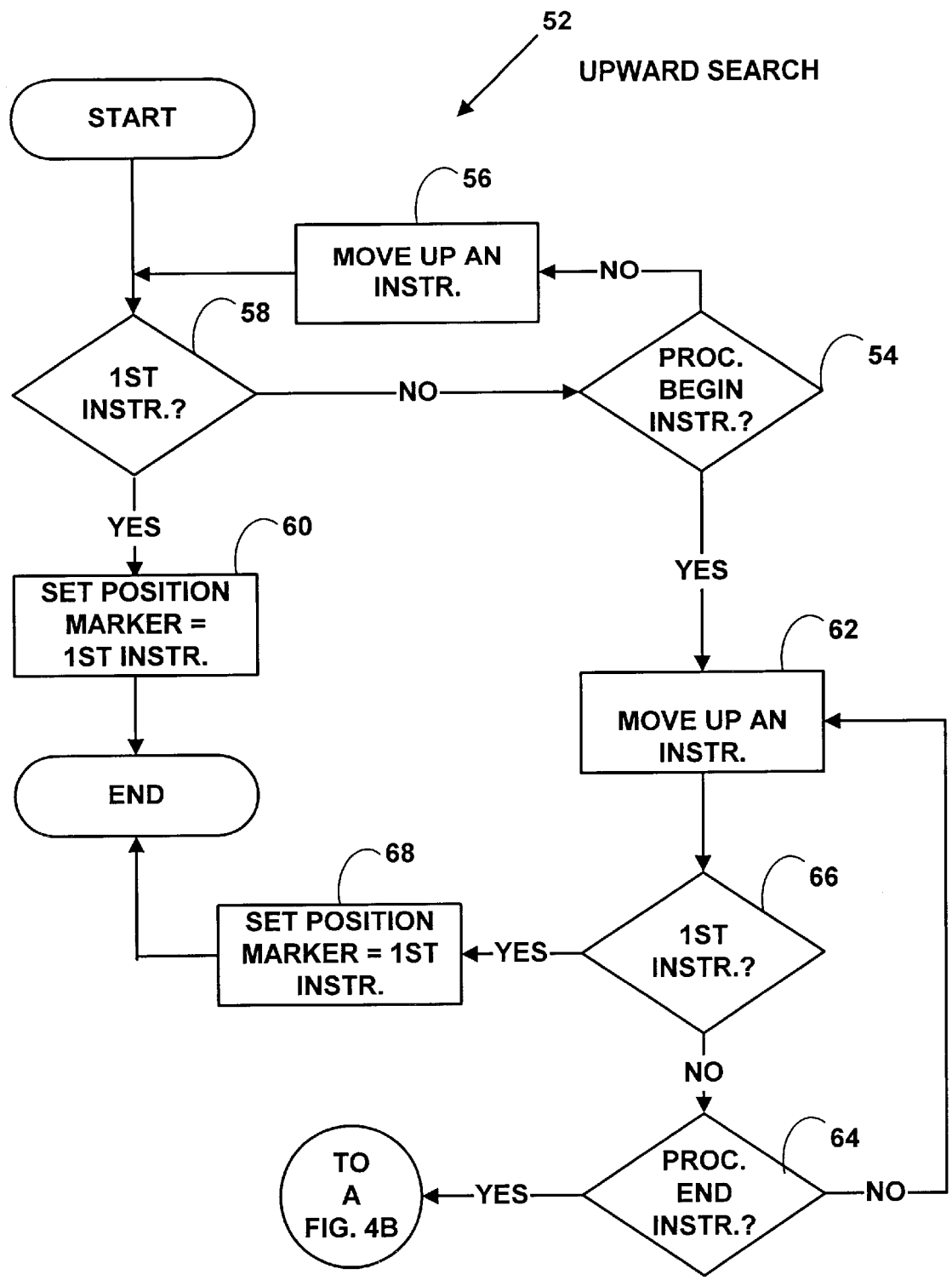
FIGS. 4A–4C is a flow chart illustrating an upward search for a preferred embodiment of the present invention.
Figure 4B:
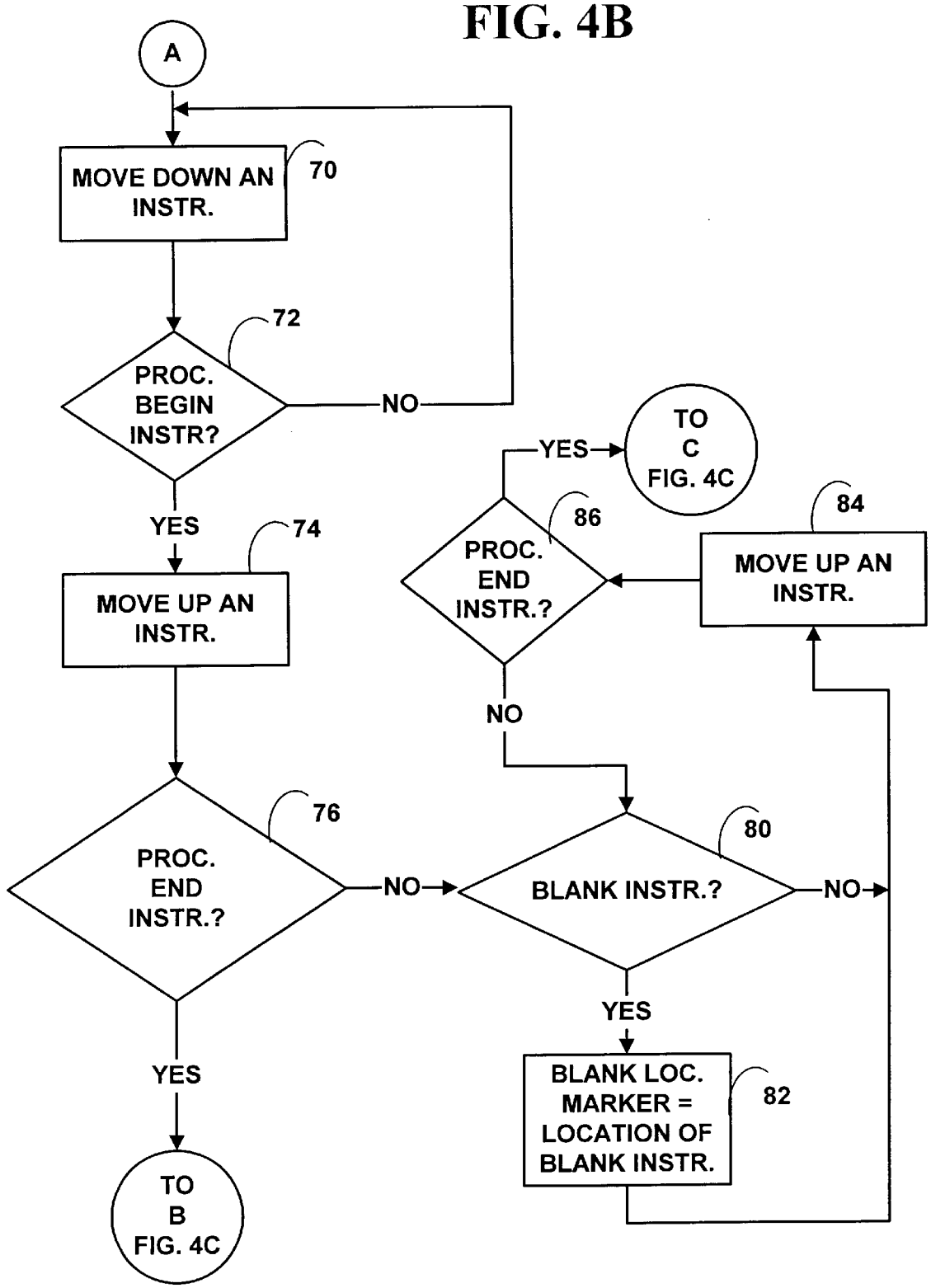
Figure 4C:
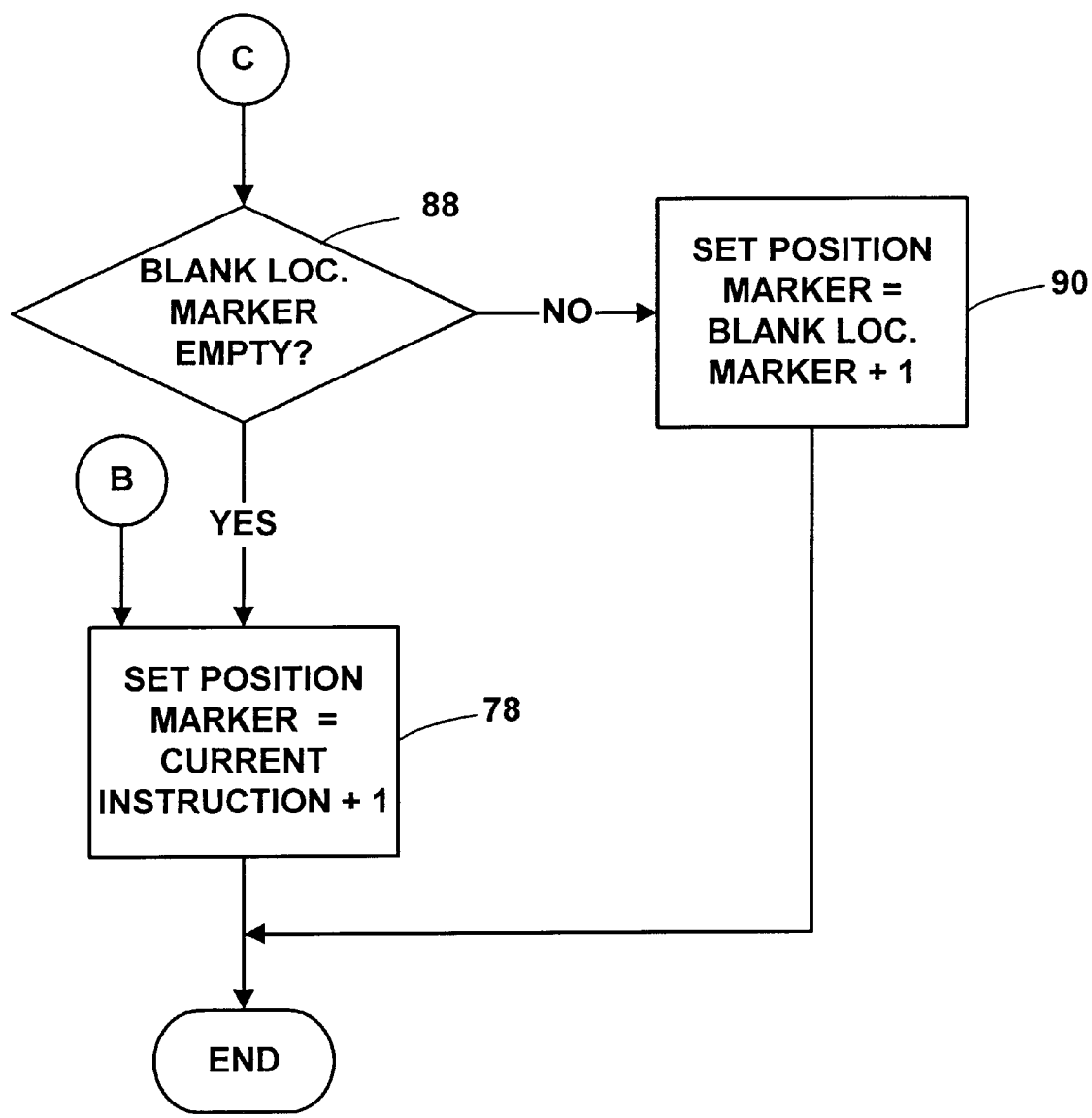

The flow chart in FIGS. 4A–4C illustrate an initial upwards search 52 in the source code using the procedure boundary detection method 34. After completion of the procedure boundary detection, the operating system and/or an application in computer system 10 is left with a position marker represented by a pointer (e.g., called a boundary pointer) to the beginning of a desired procedure.

The procedure boundary detection method 34 uses as one searching process an upward search 52. A second searching process a downward search, will be explained below. The upward search 52 searches for a procedure begin instruction 54 (e.g., "sub") by moving up one instruction at a time 56 in the source code from an initial starting position which can be anywhere in the source code. If the first instruction in the source code is reached 58 without locating a procedure begin instruction, the position marker is set to the first instruction in the source code 60 and the upward search 52 ends.

If a procedure begin instruction is located, the search continues from one instruction above 62 the procedure begin instruction. The upwards searching 62–66 seeks an end procedure (e.g., end sub) instruction 64 in the source code above the procedure begin instruction that was just located 54 (there may be multiple procedure begin instructions above the procedure begin instruction 54 just located). If the first instruction in the source code 66 is reached without locating a procedure end instruction, the position marker is set to the first instruction in the source code 68 and the upward search 52 ends since the desired procedure begins on the first instruction of source code.

If a procedure end instruction is located, the search continues one instruction below 70 (FIG. 4B transition block in FIG. 4A says "3B") the procedure end instruction just located 64. The search direction is now changed to a downwards direction 70–72 (i.e., searching instructions succeeding the procedure end instruction found) and seeks a procedure begin instruction 72 (which may or may not be same the procedure begin instruction located earlier at process block 54) below the procedure end instruction just located 64. When a procedure begin instruction is located 72 below the procedure end instruction 64 the search continues one instruction above 74 the procedure begin line just located. The instructions above the procedure begin instruction just located 72 are examined.

The instructions located between the procedure begin instruction 72 and the procedure end instruction 64 are examined one by one by moving up one instruction at a time 74 in the source code. If after moving up one instruction in the source code, the current instruction is the procedure end instruction 76 (i.e., the procedure end instruction located earlier at process block 64), the desired procedure has no preceding comments, blank lines, or conditional compilation instructions. For example, in this case the upward search 52 for a desired procedure may be in the following state:

| | |
|---|---|
| → line x | end sub |
| line x+1 | sub proc_desired | where the arrow "→" represents the current instruction in the source code. The position marker is adjusted (FIG. 4C) to point one instruction below the current instruction 78 (i.e., line x+1) since the current instruction (line x) is actually the procedure end instruction 64. The position marker now points to the beginning of the desired procedure as is shown below.

| | |
|---|---|
| line x | end sub |
| → line x+1 | sub proc_desired |

If the current instruction is not the procedure end instruction 76, there are one or more instructions (e.g., conditional compilation instructions, blank instructions, comments) between the procedure begin 72 and the procedure end 64 instructions.

The current instruction is checked for a blank instruction 80 (FIG. 4B). If the current instruction is a blank instruction 80, a blank location marker is set 82 to a value for the location in the source code (e.g., a line number) of the blank instruction just encountered. The search continues by moving up one instruction 84 until the procedure end instruction located earlier 64 is relocated 86.

After the procedure end instruction 64 is relocated 86, the value of blank location marker is checked 88 (FIG. 4C). If the blank location marker is empty (e.g., equal to null or zero) there are no blank instructions between the procedure end instruction 64 relocated 86 and the procedure begin instruction 72 (however, there may be multiple conditional compilation instructions and comments) so the position marker is set to point to one instruction below the current instruction 78 (i.e., one instruction below the procedure end instruction 64). For example, the source code may have the following sequence of instructions, with the blank location marker empty:

```
line 1 sub proc1
line 2 end sub
line 3 ' comment 1
line 4 ' comment 2
line 5 #if VAR ' conditional compilation
line 6 sub desired_proc
```

The position marker is set 78 to line 3 which is the start of the procedure "desired_proc".

If the blank location marker is not empty 88, the position marker is set 90 to point to one instruction below the location of the blank instruction stored in the blank location marker. For example, the source code may have the following sequence of instructions where the blank location marker points to line 4:

```
line 1 sub proc1
line 2 end sub
line 3 ' comment 1
line 4
line 5 ' comment 2
line 6
line 7 #if VAR ' conditional compilation
line 8 sub desired_proc
```

The position marker is set to line 5 which is considered the start of the procedure "desired_proc". The comment on line 3 is therefore associated with procedure "prod1" as a trailing comment instead of procedure "desired_proc" as a preceding comment.

As an example, an upward search 52 is conducted on the source code 44 in FIG. 3A starting at line 13 for a desired procedure NumCom. Process steps 52–54 are repeated until a procedure begin instruction (e.g., at line 12) is located. Since this instruction is not the first instruction in the source code 58, the search continues by moving up an instruction 62 (e.g., to line 11). Process steps 62–66–64 are repeated until a procedure end instruction is located (e.g., at line 3). The search continues by moving down an instruction 70 (e.g., to line 4). The search continues in a downward direction 70–72 until a procedure begin instruction (e.g., at line 9) is located 72 (which is not the original procedure begin instruction encountered at line 12). The search continues by moving up one instruction (e.g., to line 8) above the procedure begin instruction 74 just located. The instructions between the procedure begin instruction (e.g., at line 9) and the procedure begin instruction (e.g., at line 3) are examined.

The first instruction encountered is examined 82 and this instruction (e.g., at line 8) is not a blank instruction (it is a conditional compilation instruction), so the search continues by moving up one instruction 84 (e.g., to line 7). This instruction is a blank instruction 80, so the blank location marker is set 82 to the location of the current blank instruction (e.g., set to line 7). The search continues by moving up one instruction 84 (e.g., to line 6). This instruction is a second blank instruction 80, so the current blank location marker is reset 82 to the location of the current blank instruction (e.g., reset to line 6). The search continues by moving up one instruction 84 (e.g., to line 5). This instruction is not a second blank instruction (i.e., it is a comment). The search continues by moving up one instruction 84 (e.g., to line 4). This instruction is a blank instruction 80 so the blank location marker is reset again 82 to the location of the blank instruction (e.g., reset to line 4). The search continues by moving up one instruction (e.g., to line 3). This is a procedure end instruction 86, so the blank location marker is checked 88. The blank location marker is set to line 4, so the position marker is set 90 to one line below the blank location marker (e.g., to line 5) which is the start of the desired procedure NumCom including conditional compilation statements (e.g., lines 8, 11, and 14) and preceding comments (e.g., line 5).

Figure 5:
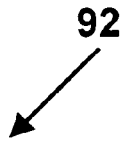
FIG. 5 is an illustration of a procedural view of a procedure from the source code in FIG. 3A for a preferred embodiment of the present invention.

The position marker is used to display the source code instructions 92 for the desired procedure NumCom in a procedural view as is illustrated in FIG. 5. As can be seen from FIG. 5, the procedure NumCom is correctly displayed including conditional compilation statements, as well as comments separated by blank instructions.

The comment at line five in FIG. 5 is associated with the procedure NumCom which spans lines eight through fifteen even though this comment is separated from the procedure NumCom by multiple blank instructions. Comments separated by more than one blank instruction are also associated with a desired procedure by the procedure boundary detection method 34. In other methods known in the art, the comment at line five in FIG. 3A would typically not be associated with the procedure NumCom since it is separated from the procedure by more than one blank line.

Process steps 80–90 in the downward search 52 could also be replaced by alternative methods to determine which comments are associated with a desired procedure (e.g., by parsing the contents of a comment).

Figure 6A:
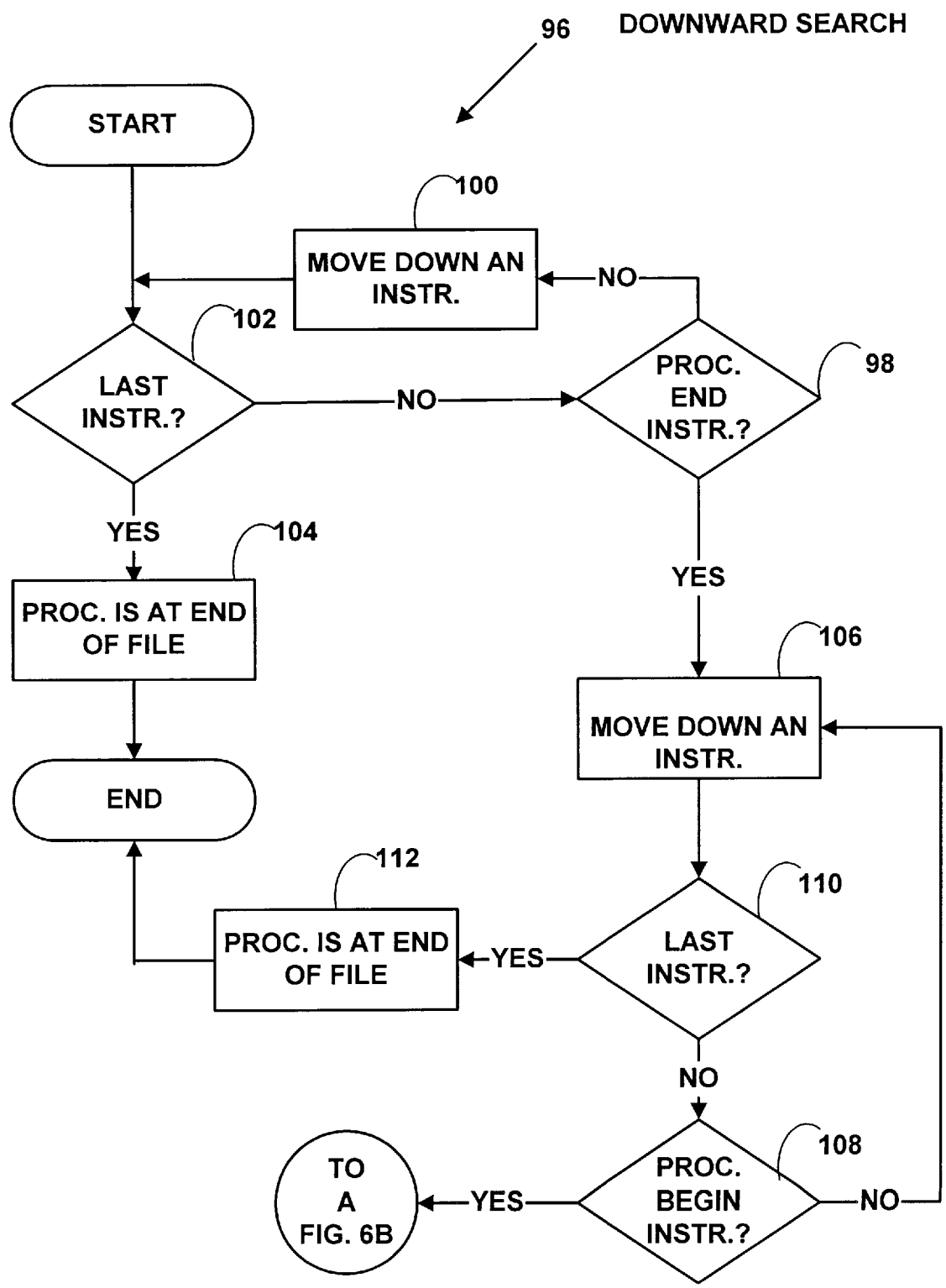
FIGS. 6A–6C is a flow chart illustrating a downward search for a preferred embodiment of the present invention.
Figure 6B:
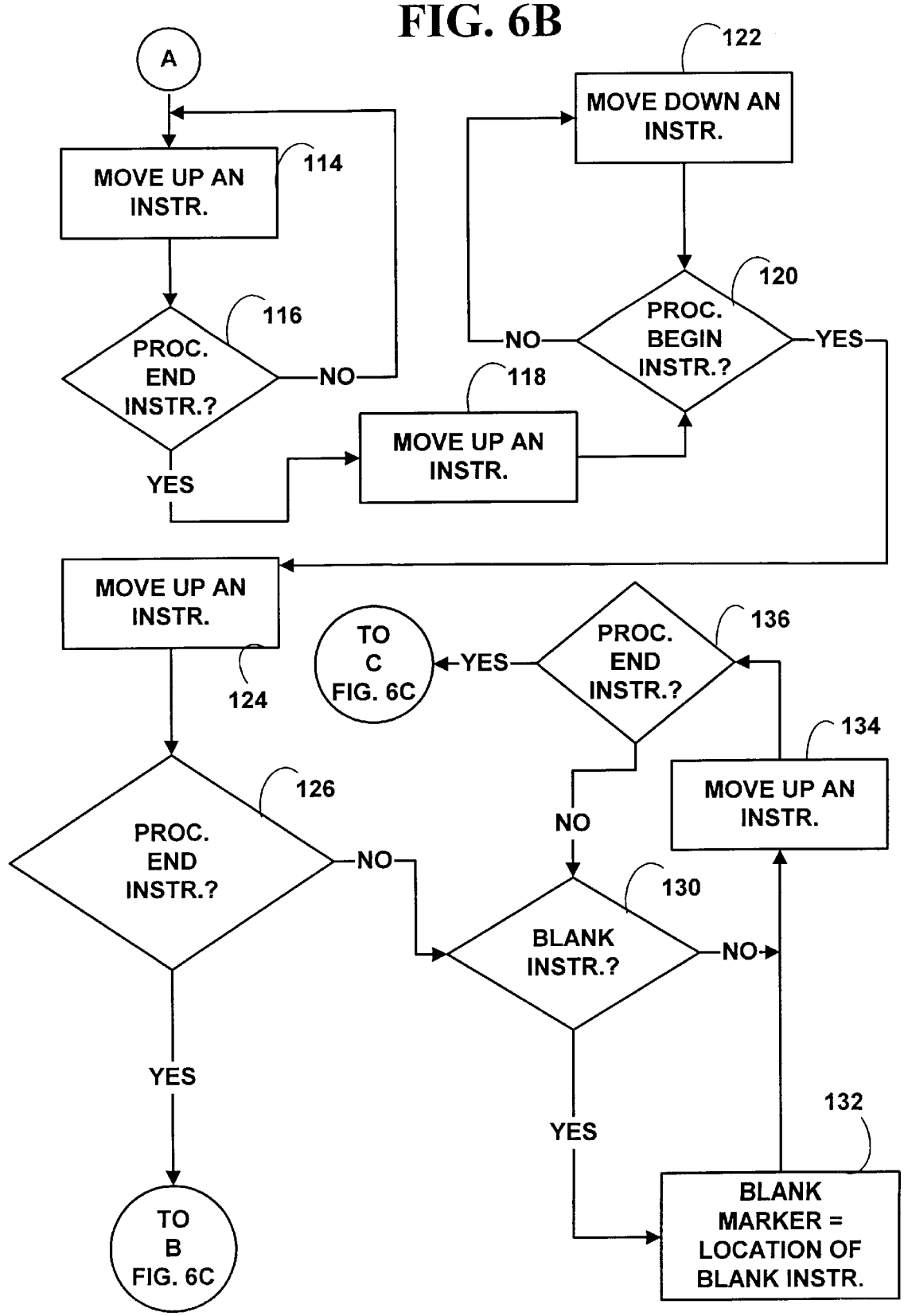
Figure 6C:
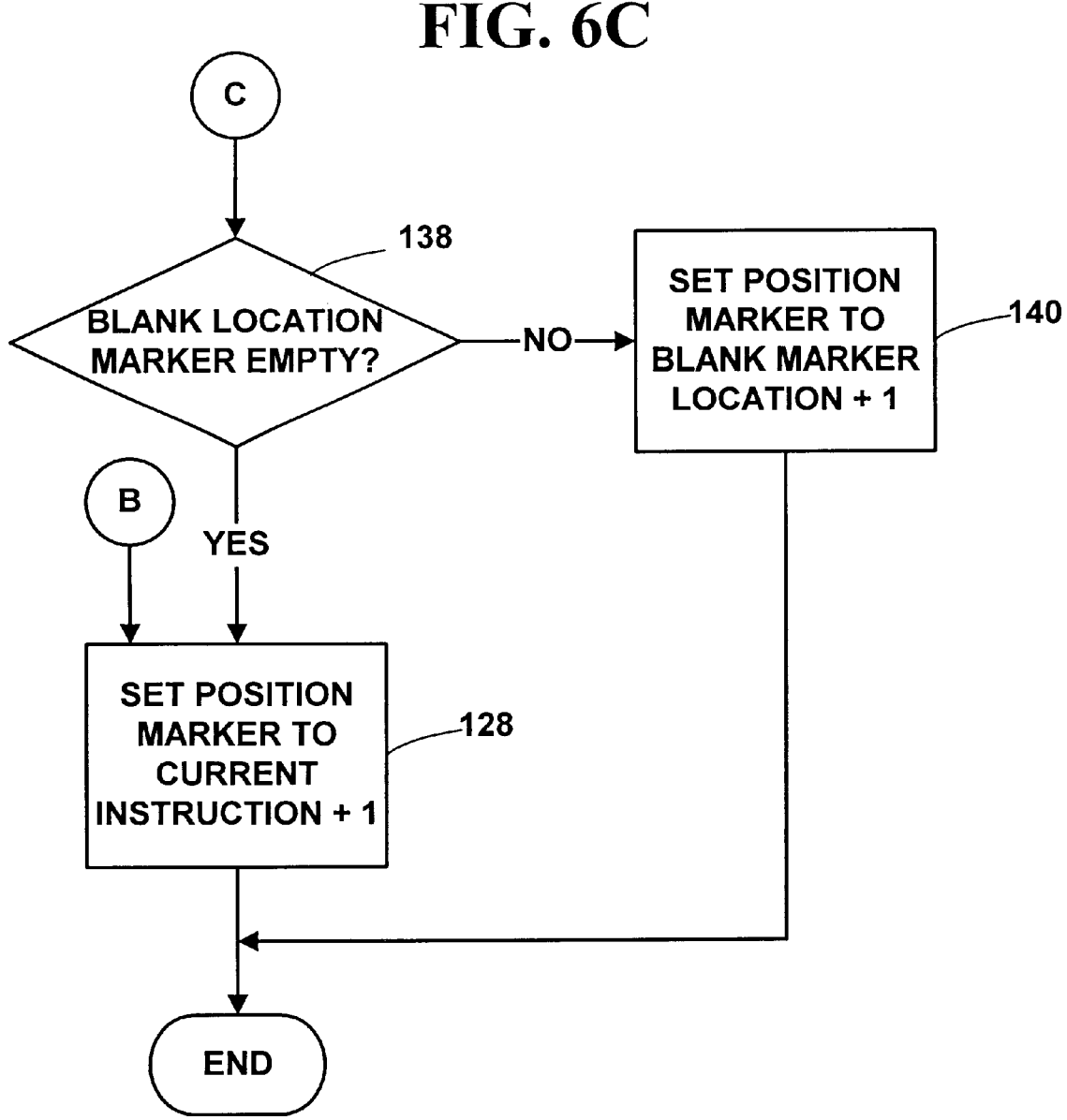

The procedure boundary detection method 34 is also used with an initial downward search 96 as is shown in the flowchart in FIGS. 6A–6C and steps 98–140. The downward search 96 looks first for procedure end instruction (e.g., end sub) instead of a procedure begin instruction (e.g., sub). The downwards search also has an additional downwards search step, that is not necessary in the upward search, to find the beginning of a desired procedure as is shown by steps 118–122 in FIG. 6B. Either the upwards or downwards search can be used from any initial instruction position in the source code to determine the beginning boundaries of a desired procedure.

Once the position of the beginning boundary is determined for a desired procedure, in a preferred embodiment of the present invention the procedure end boundary is determined by completing steps 98–116, and steps 124–140 of FIGS. 6A–6C. The position marker described above (containing the position of the beginning of the procedure) is used with the downward search 96 of FIGS. 6A–6C. However, steps 118–122 are skipped, step 124 is changed to "move down a instruction" and step 134 is changed to "move down an instruction" to determine the procedure end boundary. Using the downward search 96 of the procedure boundary detection method shown in FIGS. 6A–6C and modified as described above helps ensure the proper procedure end boundary is determined, even if there are more than one procedure end instruction contained in conditional compilation instructions. However, other search methods can also be used to determine the procedure end boundary.

In an alternative embodiment of the present invention, the upward search 52 shown in FIGS. 4A–4C and the downward search 96 shown in FIGS. 6A–6C are combined to provide a "wrap-around" search. For example, if the upward search 52 (FIGS. 4A–4C) was used first, and the first instruction in the source code is hit without finding a desired procedure (e.g., by starting on the second line of the source code), the direction is changed, and the downward search 96 (FIGS. 6A–6C) is used, searching down from the first instruction towards the last instruction in the source code. If a downwards search was used first, and the last instruction in the source code is hit, the direction is changed, and the upward search is used, searching up from last instruction towards the first instruction. This combination allows a instruction pointer used in the source code to "wrap around" in the source code (i.e., move from bottom-to-top, or from top-to-bottom of the source) allowing all of the source code to be automatically searched.

The procedure boundary detection method 34, using up 52 or down 96 searching, or a combination thereof, determines the boundaries of a given procedure, including the proper handling of conditional compilation instructions and comments from any initial starting position in the source code with a search time N, where N is proportionate to the number of source code instructions around a selected procedure. This is an improvement over other procedure boundary detection methods known in the art which typically require search time M proportional to the total number of instructions in all procedures in the source code module (e.g., searching the whole source code top-to-bottom, or bottom-to-top) multiple times to determine procedure boundaries, but do not correctly handle procedure boundaries with conditional compilation instructions or the comments associated with a procedure.

A preferred embodiment of the present invention is implemented in the development tools (e.g., user interface) provided by the Visual Basic® 4.0 programming language. However, the procedure boundary detection method and system described in detail is not limited to Visual Basic® development tools and can be used by other software development tools to determine procedure boundaries for other programming languages (e.g., C, C++, Visual C++, JAVA, etc.).

Figure 7A:
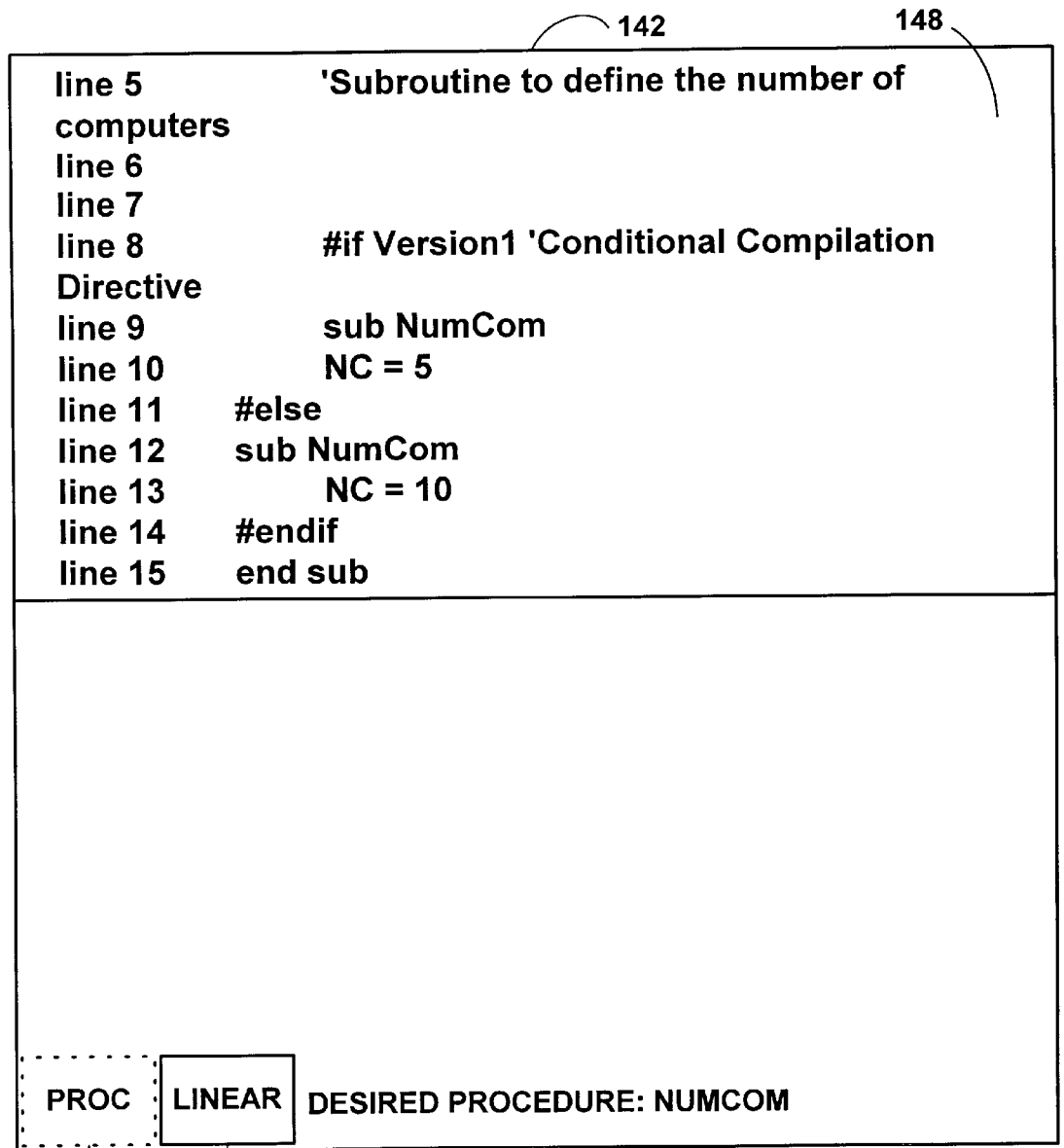
FIG. 7A is a block diagram illustrating a user interface for a preferred embodiment of the present invention showing a procedural view of source code.

As is shown in FIG. 7A, in a preferred embodiment of the present invention, a Visual Basic® user interface tool provides a user interface 142 which has multiple buttons (two of which 144,146 are actually illustrated). A pair of these buttons 144,146 are used to toggle the display view between a procedural view, and a linear or monolithic view. However, one button, or more than two buttons, could also be used to toggle between a linear and a procedural view.

For example, using two separate buttons, if the desired view is procedural 148, then button 144 is depressed (i.e., illustrated by the dashed line for button 144 in FIG. 7A) the procedure boundary detection method 34 described above is used to determine the boundaries of a desired procedure (e.g., the procedure NumComs shown in FIG. 3A) as is illustrated in FIG. 7A. A user can switch between the two views on the user interface by "pressing" the appropriate button (e.g., with a mouse, a keyboard input, etc.). The proper view is automatically displayed by the user interface 142. Only one procedure is displayed in FIG. 7A. However, multiple procedures in multiple windows (not shown) could also be displayed.

Figure 7B:
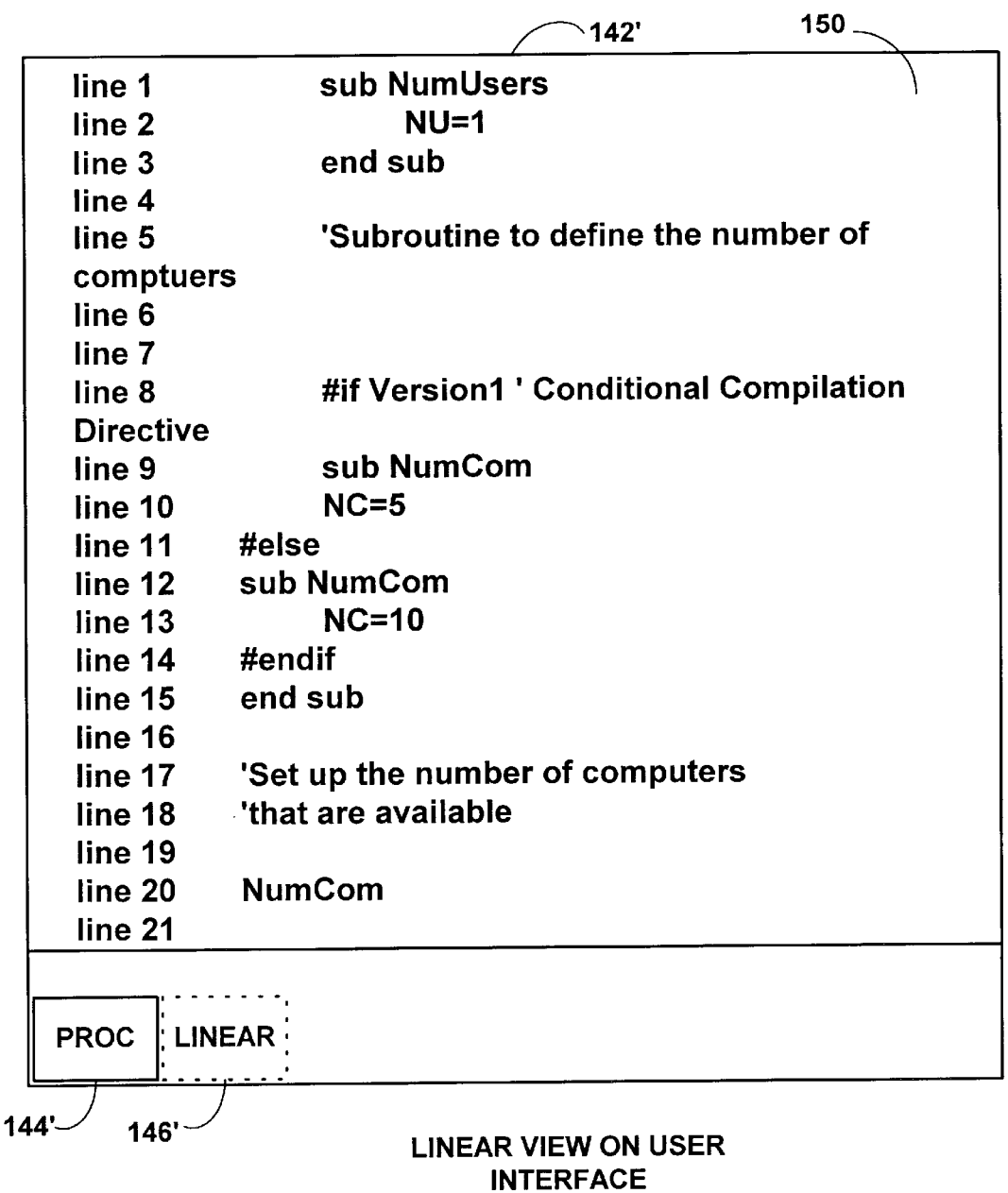
FIG. 7B is a block diagram illustrating a user interface for a preferred embodiment of the present invention showing a linear view of source code.

If a linear or monolithic is desired 150 (FIG. 7B), then button 146 is pressed (i.e., illustrated by the dashed line for button 146' in FIG. 7B) and the source code is displayed in a linear view as is shown in FIG. 7B. The user interface 142 also includes additional buttons (not shown) to perform other functions on the procedural and/or linear views (e.g., magnify, unmagnify, change size).

It should also be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of my invention. Rather, we claim as our invention all such embodiments as come within the scope and spirit of the following claims and equivalents thereto.

We claim:

1. A computer implemented method of detecting a procedure boundary in a program source code, and displaying such code on an output device, the steps comprising:

selecting code, the code including a sequence of instructions suitable for processing by a computer, and one or more procedures which have an unequal number of procedure beginning and ending instructions;

searching said code for said procedure beginning and ending instructions;

determining the boundaries of said procedures, notwithstanding said unequal number of procedure beginning and ending instructions, so that individual procedures can be displayed to the user.

2. The method of claim 1 in which the determining step includes:

selecting a location in said code;

searching instructions in said code preceding said location for a first procedure beginning instruction;

searching instructions in said code preceding the first procedure beginning instruction for a procedure ending instruction;

searching instructions in said code succeeding the procedure ending instruction for a second procedure beginning instruction;

searching instructions in said code preceding the second procedure beginning instruction until a instruction which is not a conditional compilation instruction is encountered; and identifying the instruction thereby found as the beginning of the procedure.

3. The method of claim 1 in which the determining step includes:

selecting a location in said code;

searching instructions in said code succeeding said location for a first procedure ending instruction;

searching instructions in said code succeeding the first procedure ending instruction for a first procedure beginning instruction;

searching instructions in said code preceding the first procedure beginning instruction for a second procedure ending instruction;

searching instructions in said code succeeding the second procedure ending instruction for a second procedure beginning instruction;

searching instructions in said code preceding the second procedure beginning instruction until a instruction which is not a conditional compilation instruction is encountered; and identifying the instruction thereby found as the beginning of the procedure.

4. The method of claim 1 wherein the unequal number of procedure beginning and ending instructions is due to conditional compilation instructions.

5. The method of claim 1 including displaying said procedures in a procedural view whose boundaries have been determined.

6. The method of claim 1 in which the code includes comments associated with said procedures wherein the determining step includes determining which comments are associated with said procedures based on spacing of said comments.

7. The method of claim 1 in which the determining step includes determining said procedure boundaries starting from any location in said code.

8. A computer readable storage medium having stored therein instructions for causing a computer to perform the method of claim 1.

9. A computer implemented method of detecting a procedure boundary within computer source code for a desired procedure, the steps comprising:

selecting computer source code, the computer source code including a sequence of instructions suitable for processing by a computer;

selecting a location in said computer source code;

searching source code instructions for a desired procedure beginning instruction;

upon locating the desired procedure beginning instruction, searching instructions preceding and succeeding the located desired procedure beginning instruction in the computer source code for other procedure beginning and ending instructions; and determining the boundaries of the desired procedure from the location of other procedure beginning and ending instructions in the computer source code so that the desired procedure can be displayed to a user;

wherein the method permits the display of a procedure having an unequal number of beginning and ending instructions.

10. The method of claim 9 in which the searching instructions preceding and succeeding the located procedure beginning instruction in the computer source code for other procedure beginning and ending instructions step includes:

searching instructions in said computer source code preceding said location for a first procedure beginning instruction;

searching instructions in said computer code preceding the first procedure beginning instruction for a procedure ending instruction;

searching instructions in said computer source code succeeding the procedure ending instruction for a second procedure beginning instruction;

searching instructions in said code preceding the second procedure beginning instruction until a second procedure ending instruction is encountered; and identifying an instruction succeeding the instruction thereby found as the beginning instruction of the desired procedure.

11. The method of claim 9 in which the searching instructions preceding and succeeding the located procedure beginning instruction in the computer source code for other procedure beginning and ending instructions step includes:

searching instructions in said code succeeding said position for a first procedure ending instruction;

searching instructions in said code succeeding the first procedure ending instruction for a first procedure beginning instruction;

searching instructions in said code preceding the first procedure beginning instruction for a second procedure ending instruction;

searching instructions in said code succeeding the second procedure ending instruction for a second procedure beginning instruction;

searching instructions in said code preceding the second procedure beginning instruction until a third procedure ending instruction is encountered; and identifying an instruction succeeding the instruction thereby found as the beginning instruction of the desired procedure.

12. The method of claim 9 wherein the computer source code contains unequal number of procedure beginning and ending instructions due to conditional compilation instructions.

13. The method of claim 9 including displaying said procedures in a procedural view whose boundaries have been determined.

14. The method of claim 9 in which the computer source code includes comments associated with said procedures wherein the determining step includes determining which comments are associated with said procedures based on spacing of comments.

15. The method of claim 9 in which the determining step includes determining said procedure boundaries starting from any location in said computer source code.

16. A computer readable storage medium having stored therein instructions for causing a computer to perform the method of claim 9.

17. A method according to claim 1 for detecting and displaying program source code having an unequal number of procedure beginning and ending instructions, the method further comprising:

displaying said code in a first view; and displaying said code in a second view based on user input, the second view different from the first view, wherein one of said views is a procedural view.

18. A computer readable storage medium having stored therein instructions for causing a computer to perform the method of claim 17.

19. The method of claim 17 which includes displaying one or more of the procedures contained within said code in the procedural view.

20. The method of claim 17 in which the code includes comments associated with said procedures, and where displaying said code includes displaying said procedures and comments associated with said procedures based on spacing of said comments.

21. The method of claim 17 which includes displaying said procedures starting from any position within said code.

22. A method of software development, the steps comprising:

selecting code, the code including a sequence of instructions suitable for processing by a computer, procedures with comments associated therewith, and procedures which have an unequal number of procedure beginning and ending instructions;

determining the boundaries of said procedures; and grouping said comments with said procedures in accordance with the spacing of said comments.

23. A computer readable storage medium having stored therein instructions for causing a computer to perform the method of claim 22.

24. The method of claim 22 which includes grouping comments separated from said procedures by any number of blank instructions.

25. A method of software development that includes displaying code on a display screen for presentation to a user, the code including a sequence of instructions suitable for processing by a computer, and procedures which have an unequal number of procedure beginning and ending instructions, the steps comprising:

selecting a position within said code; and determining the boundaries of said procedures from said position, notwithstanding said unequal number of procedure beginning and ending instructions, so that individual procedures can be displayed on the display screen without first processing all said code preceding said position.

26. The method of claim 25 which includes determining the boundaries of said procedures by searching instructions in said code preceding said position, and upon reaching the first instruction in said code, changing the position to the last instruction in said code and searching instructions preceding said last instruction until the boundaries of said procedures are determined.

27. The method of claim 25 which includes determining the boundaries of said procedures by searching instructions in said code succeeding said position, and upon reaching the last instruction in said code, changing the position to the first instruction in said code and searching instructions succeeding said first instruction until the boundaries of said procedures are determined.

28. A method of software development that includes displaying code on a display device for a user, the code including a sequence of instructions suitable for processing by a computer, procedures with an unequal number of procedure beginning and ending instructions, comments associated with said procedures, and conditional compilation instructions, the steps comprising:

displaying said code in a first view, which is not a procedural view;

determining a starting position within said code;

determining the boundaries of a procedure in said code from a starting position, notwithstanding said unequal number of procedure beginning and ending instructions;

upon determining the boundaries of the procedure, grouping comments associated with the procedure in accordance with the spacing of said comments;

displaying said code in a second view based on user input, the second view different from the first view, wherein the second view is a procedural view; and displaying said procedure and said grouped comments in a procedural view for the user.

29. A method according to claim 9 for displaying computer source code on an output device, the method further comprising:

displaying said code in a first view; and displaying said code in a second view based on user input, the second view different from the first view, wherein one of said views is a procedural view.

30. The method of claim 29 which includes displaying one or more of the procedures contained within said code is displayed in the procedural view.

31. The method of claim 30, in which the code includes comments associated with said procedures, and where displaying said code includes displaying said procedures and comments associated with said procedures based on spacing of said comments.

32. A computer readable storage medium having stored therein instructions for causing a computer to perform the method of claim 30.

* * * * *